(12) United States Patent
Mizuguchi et al.

(10) Patent No.: US 8,847,541 B2
(45) Date of Patent: Sep. 30, 2014

(54) CONTROL METHOD AND CONTROL DEVICE OF MOTOR INVERTER

(75) Inventors: Daiki Mizuguchi, Kariya (JP); Shigeki Ikeda, Kariya (JP); Seiki Sakata, Kariya (JP)

(73) Assignee: Kabushiki Kaisha Toyota Jidoshokki, Aichi (JP)

(*) Notice: Subject to any disclaimer, the term of this patent is extended or adjusted under 35 U.S.C. 154(b) by 236 days.

(21) Appl. No.: 13/424,850

(22) Filed: Mar. 20, 2012

(65) Prior Publication Data

US 2012/0242260 A1 Sep. 27, 2012

(30) Foreign Application Priority Data

Mar. 23, 2011 (JP) ................................ 2011-063981
Feb. 17, 2012 (JP) ................................ 2012-032842

(51) Int. Cl.
H02P 27/04 (2006.01)
H02P 27/06 (2006.01)
H02P 21/06 (2006.01)

(52) U.S. Cl.
CPC .................................. *H02P 27/06* (2013.01); *H02P 21/06* (2013.01)
USPC ................. 318/801; 318/400.02; 318/400.14; 318/721

(58) Field of Classification Search
USPC ............ 318/400.02, 400.14, 400.15, 721, 79, 318/800, 801, 432, 599; 363/98
See application file for complete search history.

(56) References Cited

U.S. PATENT DOCUMENTS

| 5,614,803 | A | 3/1997 | Morioka et al. |
| 5,650,708 | A | 7/1997 | Sawada et al. |
| 5,699,240 | A * | 12/1997 | Obayashi ........................ 363/98 |
| 7,053,587 | B2 * | 5/2006 | Ito et al. ........................ 318/801 |
| 2005/0194925 | A1 * | 9/2005 | Ito et al. ........................ 318/801 |
| 2011/0062903 | A1 | 3/2011 | Li et al. |

FOREIGN PATENT DOCUMENTS

| JP | 06-233549 A | 8/1994 |
| JP | 07-147782 A | 6/1995 |
| JP | 08-340691 A | 12/1996 |
| JP | 11262269 | 9/1999 |
| JP | 2005-229716 A | 8/2005 |
| JP | 2007-274849 A | 10/2007 |

OTHER PUBLICATIONS

Japanese Office Action for corresponding JP Patent Application No. 2012-032842 mailed Feb. 26, 2013.

(Continued)

*Primary Examiner* — Antony M Paul
(74) *Attorney, Agent, or Firm* — Sughrue Mion, PLLC (57) ABSTRACT

A motor inverter is provided with switching elements for each phase of a 3-phase motor, and driving the motor by turning on and off the switching elements. In an example of a control device of the motor inverter, the control device includes: a stationary phase determination unit for defining a phase in a plurality of phases provided with switching elements for each area as a stationary phase in which a switching operation is not performed, based on current command value of each phase acquired from d-axis current command value and q-axis current command value of the motor, with one rotation in electrical angle of a rotor of the motor divided into a plurality of areas; and a drive unit for performing the switching operation of switching elements of the phases other than the stationary phase determined for each area to perform, and realizing 2-phase modulation control.

3 Claims, 5 Drawing Sheets

(56) References Cited

OTHER PUBLICATIONS

Office Action issued Sep. 13, 2013, in corresponding German patent application No. 102012204058.7.
Halasz, S., et al. "Two Phase PWM technique for inverter fed AC drive", Industrial Electronics Control and Instrumentation, 1997. IECON 97. 23rd International Conference, vol. 2, pp. 688-693, Nov. 9-14, 1997.
Communication dated Apr. 3, 2014 from the State Intellectual Property Office of People's Republic Of China in counterpart Chinese Patent Application No. 201210068477.4.

* cited by examiner

CONTROL METHOD AND CONTROL DEVICE OF MOTOR INVERTER

BACKGROUND OF THE INVENTION

1. Field of the Invention

The present invention relates to the technique of controlling a motor inverter for supplying a current to a motor for each phase.

2. Description of the Related Art

Generally a motor inverter is used to drive a motor such as a 3-phase motor etc. to which a current is supplied for each phase. The motor inverter is normally provided with two switching elements (a total of six switching elements) for each phase. Thus, a rotating magnetic field is generated for the motor by allowing the six switching elements to perform an ON/OFF switching operation and supplying a current to each phase through the switching elements. A control device of the motor inverter controls the switching operation of the switching elements of the motor inverter, and drives the motor.

The switching operation of the switching elements prepared for each phase is performed for each area by dividing one rotation (360 degrees) of the rotor of the motor into a plurality of areas. Thus, the drive signal provided for the switching operation of each switching element is determined for each area.

Driving a motor using a motor inverter is accompanied with a switching loss of the switching operation of a switching element. A method of reducing the switching loss can be a 2-phase modulation method. In the 2-phase modulation method, the switching operation of switching elements is not permitted in one phase of the three phases. That is, two switching elements are placed in a stationary phase in which they are placed in an ON or OFF position, and the switching elements are allowed to perform the switching operation in the remaining two phases. The stationary phase is changed for each area. Thus, by setting a stationary phase for each area, the switching loss can be reduced.

The conventional 2-phase modulation method is disclosed by, for example, Japanese Laid-open Patent Publication No. 8-340691 (U.S. Pat. No. 5,699,240, hereinafter referred to as the "patent document 1"). In the conventional 2-phase modulation method described in the patent document 1, a stationary phase is selected and determined by the phase difference between the current command value of each phase and the voltage command value of each phase obtained from the current command value of each phase.

The switching loss is a loss of power. Thus, to suppress the switching loss, it is preferable that the phase in which the maximum power (maximum power phase) is acquired is set as a stationary phase. Therefore, although the 2-phase modulation method is adopted, it is also important to more efficiently suppress the switching loss.

SUMMARY OF THE INVENTION

The present invention aims at provide the technology of driving a motor by 2-phase modulation so that a switching loss can be more efficiently suppressed.

An aspect of the present invention is a control method of a motor inverter which providing switching elements for each phase of a 3-phase motor and driving the motor by turning on and off the switching elements. In the control method, one rotation in electrical angle of a rotor of the motor is divided into a plurality of areas, and a phase in a plurality of phases provided with switching elements is defined for each area as a stationary phase in which a switching operation is not performed, based on current command value of each phase acquired from d-axis current command value and q-axis current command value of the motor, and the switching elements of the phases other than the stationary phase determined for each area are performed the switching operation, thereby realizing the 2-phase modulation control.

It is preferable that the above-mentioned stationary phase is determined after determining candidate phases as possible stationary phase depending on the voltage command value of each phase, and selecting the candidate phase from among the determined candidate phases depending on the current command value of each phase. It is further preferable to confirm the phases of the d-axis current command value and the q-axis current command value using the d-axis actual current value and the q-axis actual current value acquired from the current actually supplied to the motor.

Another aspect of the present invention is a control device of a motor inverter which having switching elements for each phase of a 3-phase motor and driving the motor by turning on and off the switching elements. The control device comprising: a stationary phase determination unit defines a phase in a plurality of phases provided with switching elements for each area as a stationary phase in which a switching operation is not performed, based on current command value of each phase acquired from d-axis current command value and q-axis current command value of the motor, with one rotation in electrical angle of a rotor of the motor divided into a plurality of areas, and a drive unit performs the switching operation of the switching elements of the phases other than the stationary phase determined for each area, and realizes the 2-phase modulation control.

DESCRIPTION OF THE PREFERRED EMBODIMENTS

The embodiments of the present invention are described below with reference to the attached drawings.

Figure 1:
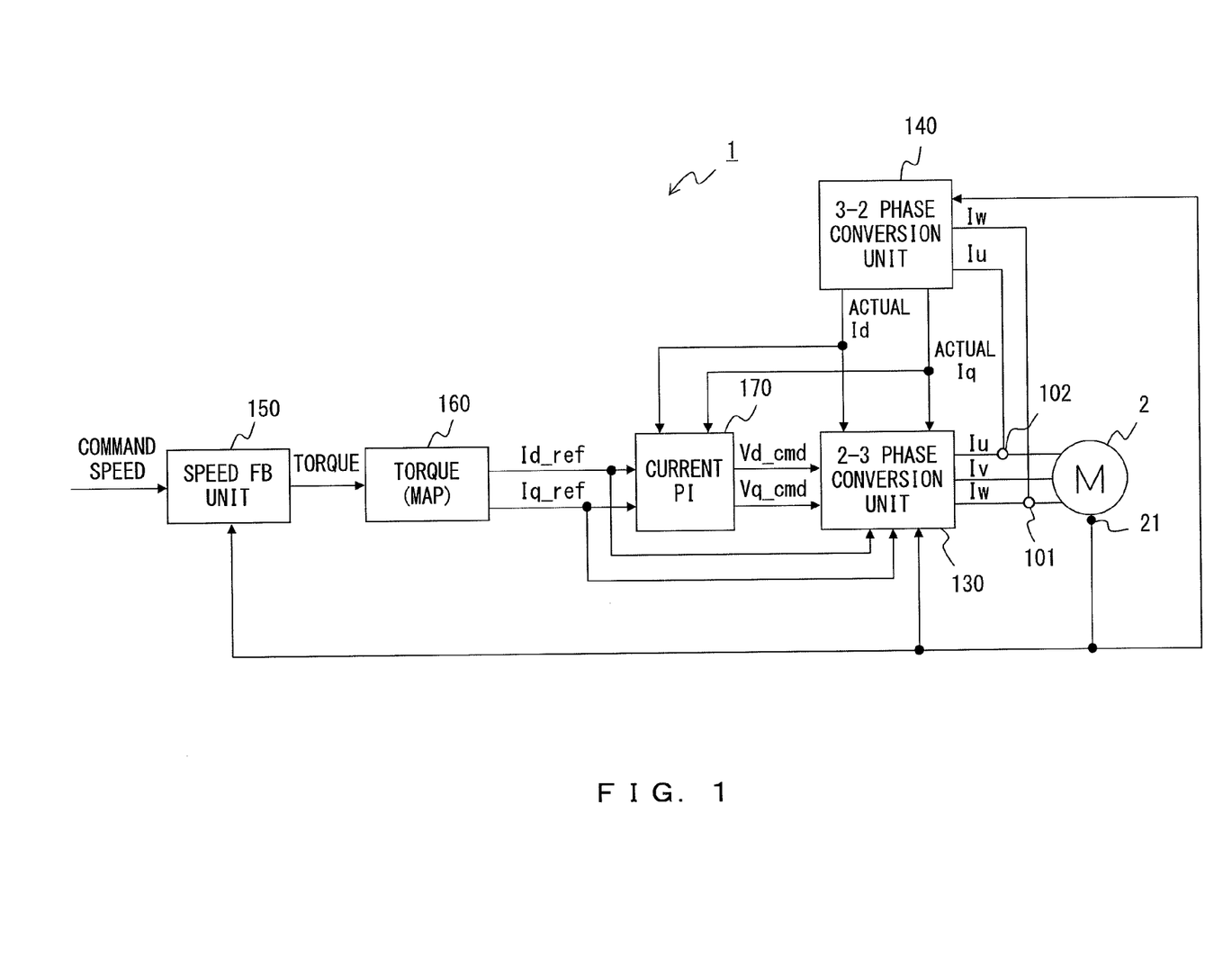
FIG. 1 is an explanatory view of the configuration of a control device of a motor inverter according to an embodiment of the present invention.
Figure 2:
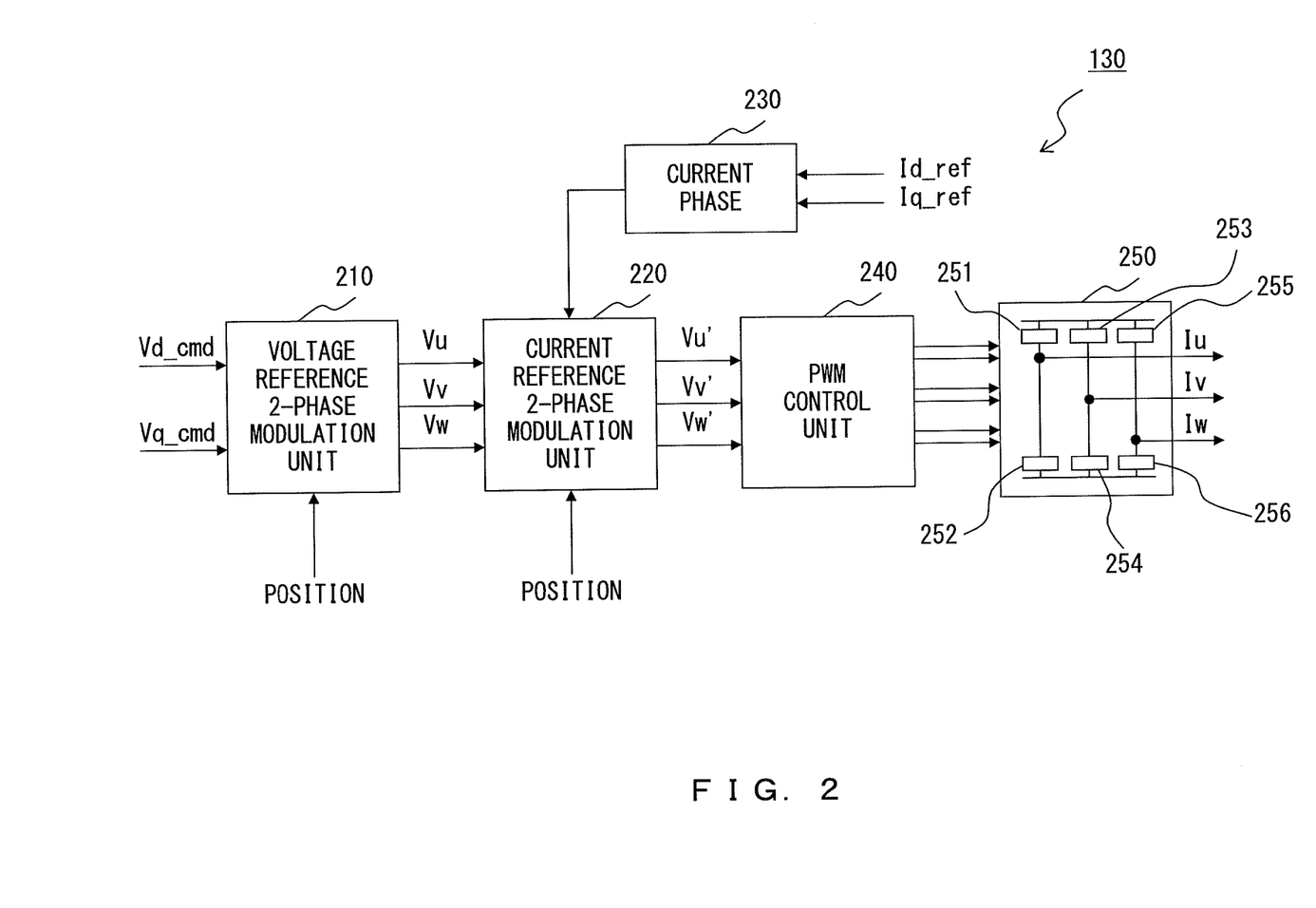
FIG. 2 is an explanatory view of the configuration of a 2-3 phase conversion unit loaded into a control device of a motor inverter according to an embodiment of the present invention.

FIG. 1 is an explanatory view of the configuration of a control device of a motor inverter according to an embodiment of the present invention. FIG. 2 is an explanatory view of the configuration of a 2-3 phase conversion unit loaded into the control device of the motor inverter.

A control device 1 of the motor inverter (hereafter referred to simply as a "control device") is to drive a 3-phase motor 2, and the motor inverter used in driving the motor 2 is provided on a 2-3 phase conversion unit 130 as illustrated in FIG. 2. Thus, the 2-3 phase conversion unit 130 supplies currents Iu, Iv, and Iw respectively to the U phase, V phase, and W phase of the motor 2.

As illustrated in FIG. 1, the control device 1 includes, in addition to the 2-3 phase conversion unit 130, a 3-2 phase conversion unit 140, a speed FB unit 150, a torque/current command value conversion unit 160, a current PI (proportional integral) control unit 170, and two current sensors 101 and 102 for detecting the current values of currents Iw and Iu.

The motor 2 is loaded with a rotation sensor 21 capable of designating the position of a rotor not illustrated in FIG. 1 by an electrical angle. The value detected by the rotation sensor 21 (indicating the electrical angle of the rotor, and hereafter referred to as a "rotation sensor value") is output to the 2-3 phase conversion unit 130, the 3-2 phase conversion unit 140, and the speed FB unit 150. The speed FB unit 150 is to input a command speed that a drive condition for driving the motor 2 from the outside.

The speed FB unit 150 calculates the rotation speed of the motor 2 from the rotation sensor value input from the rotation sensor 21, compares the calculated rotation speed with the command speed, and calculates the torque with which the rotation speed of the motor 2 equals the command speed. The calculated torque is output to the torque/current command value conversion unit 160.

The 3-2 phase conversion unit 140 calculates and outputs an actual d-axis current value Id (hereafter referred to as an "actual Id") and an actual q-axis current value Iq (hereafter referred to as an "actual Iq") of a dq coordinates system using the currents Iu and Iw obtained from the current sensors 102 and 101. The d-axis current value is a component parallel to the direction of the magnetic flux, and the q-axis current value orthogonal to the d axis is a component in the direction of the torque.

The torque/current command value conversion unit 160 is a map for output of a d-axis current command value Id_ref and a q-axis current command value Iq_ref corresponding to the torque inputted from the speed FB unit 150. The Id_ref and the Iq_ref are output to the current PI control unit 170 and the 2-3 phase conversion unit 130 respectively.

The current PI control unit 170 inputs the Id_ref and the Iq_ref from the torque/current command value conversion unit 160, inputs an actual Id and an actual Iq from the 3-2 phase conversion unit 140, and calculates a d-axis voltage command value Vd_cmd and a q-axis voltage command value Vq_cmd so that the actual Id and the actual Iq match the Id_ref and the Iq_ref respectively depending on the deviation between them. The calculated Vd_cmd and Vq_cmd are output to the 2-3 phase conversion unit 130.

The 2-3 phase conversion unit 130 inputs the Vd_cmd and the Vq_cmd from the current PI control unit 170, inputs the Id_ref and the Iq_ref from the torque/current command value conversion unit 160, converts the 2-phase dq coordinates system into the 3-phase system, and supplies the currents Iu, Iv, and Iw to a motor 2. With reference to FIGS. 2 and furthermore 3 through 5, the 2-3 phase conversion unit 130 is described in detail below.

Figure 3:
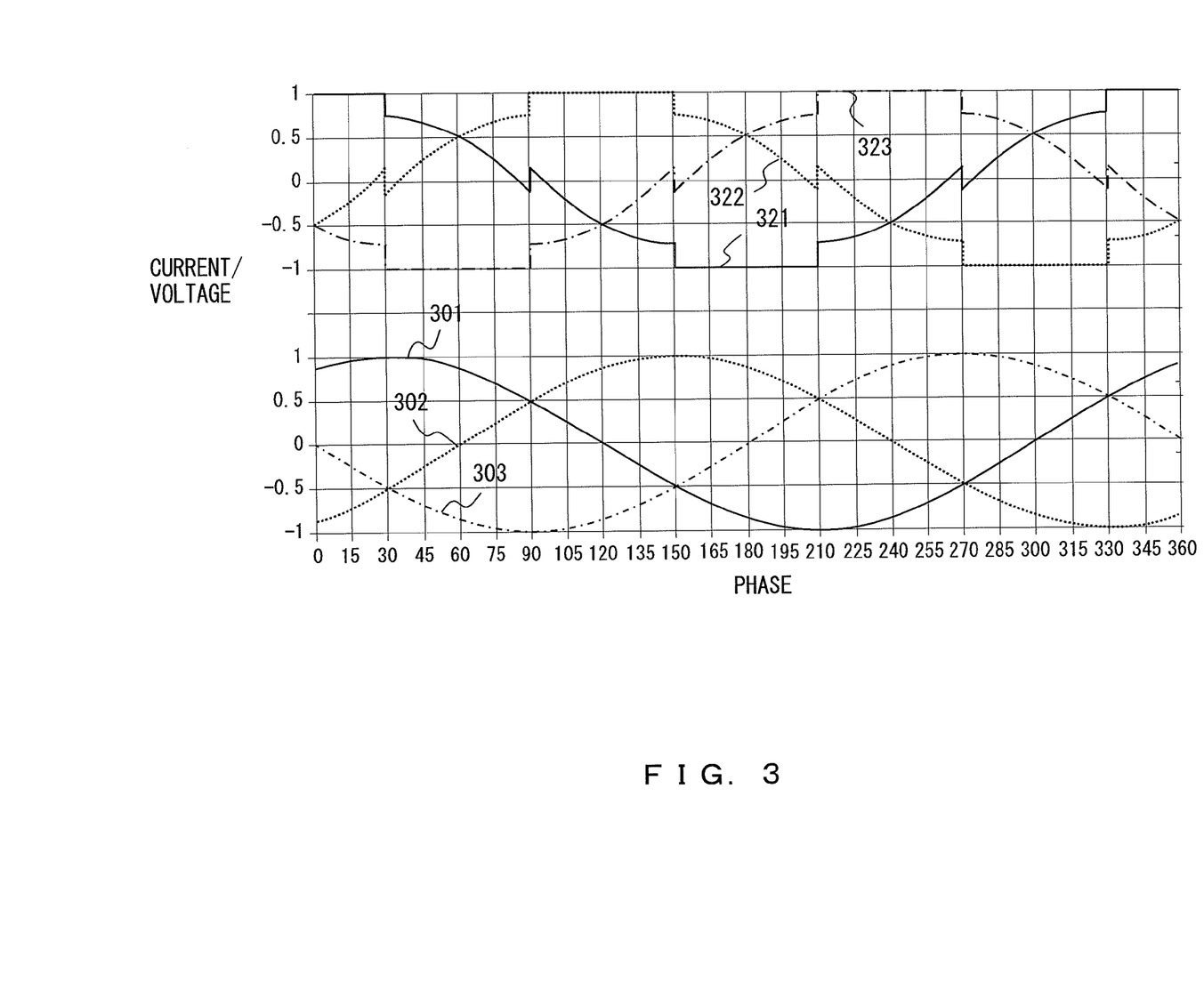
FIG. 3 is an example (1) of changes of a current command waveform of each phase, a voltage command waveform of each phase, a phase area of a current, and a phase area of a voltage command.
Figure 4:
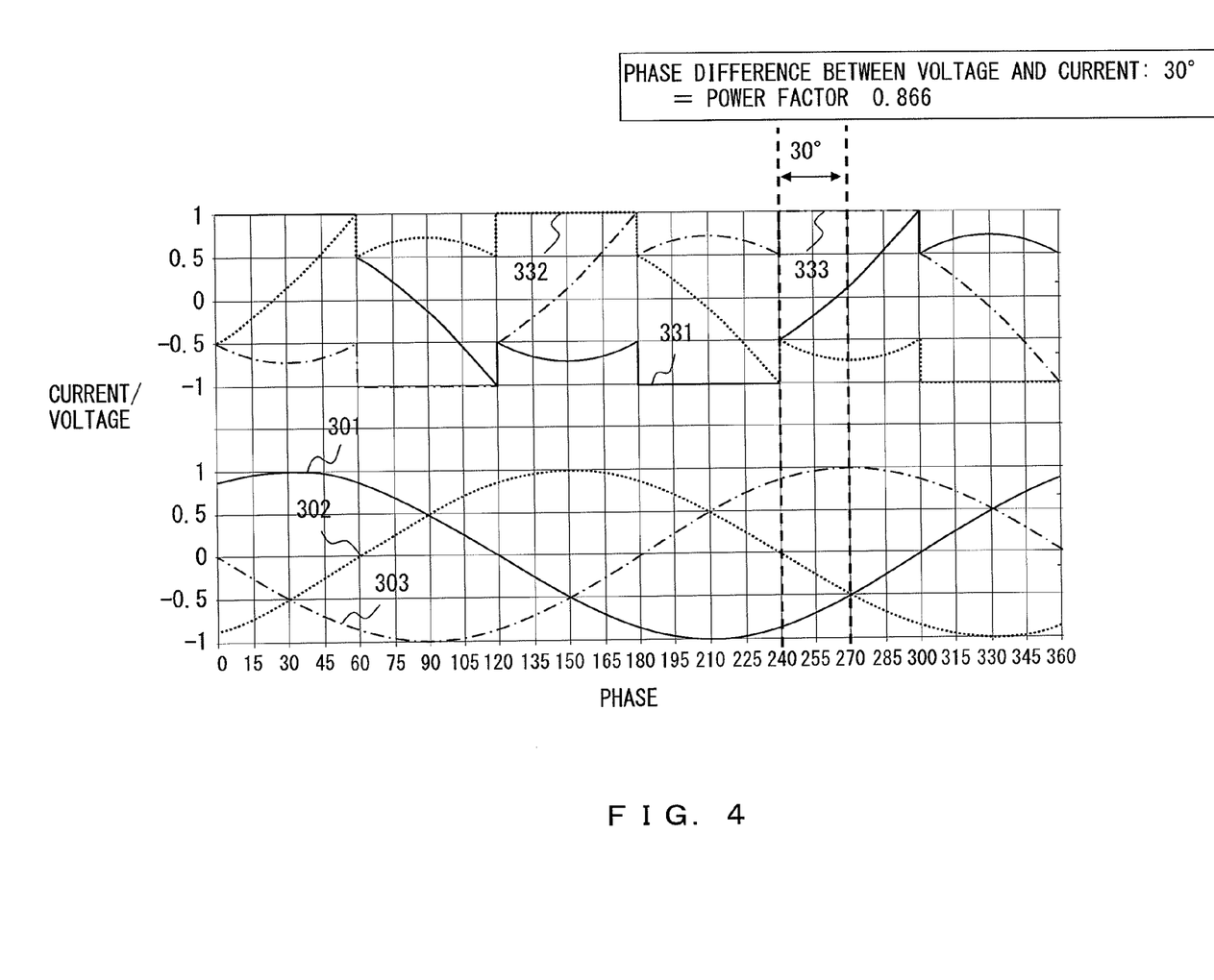
FIG. 4 is an example (2) of changes of a current command waveform of each phase, a voltage command waveform of each phase, a phase area of a current, and a phase area of a voltage command.
Figure 5:
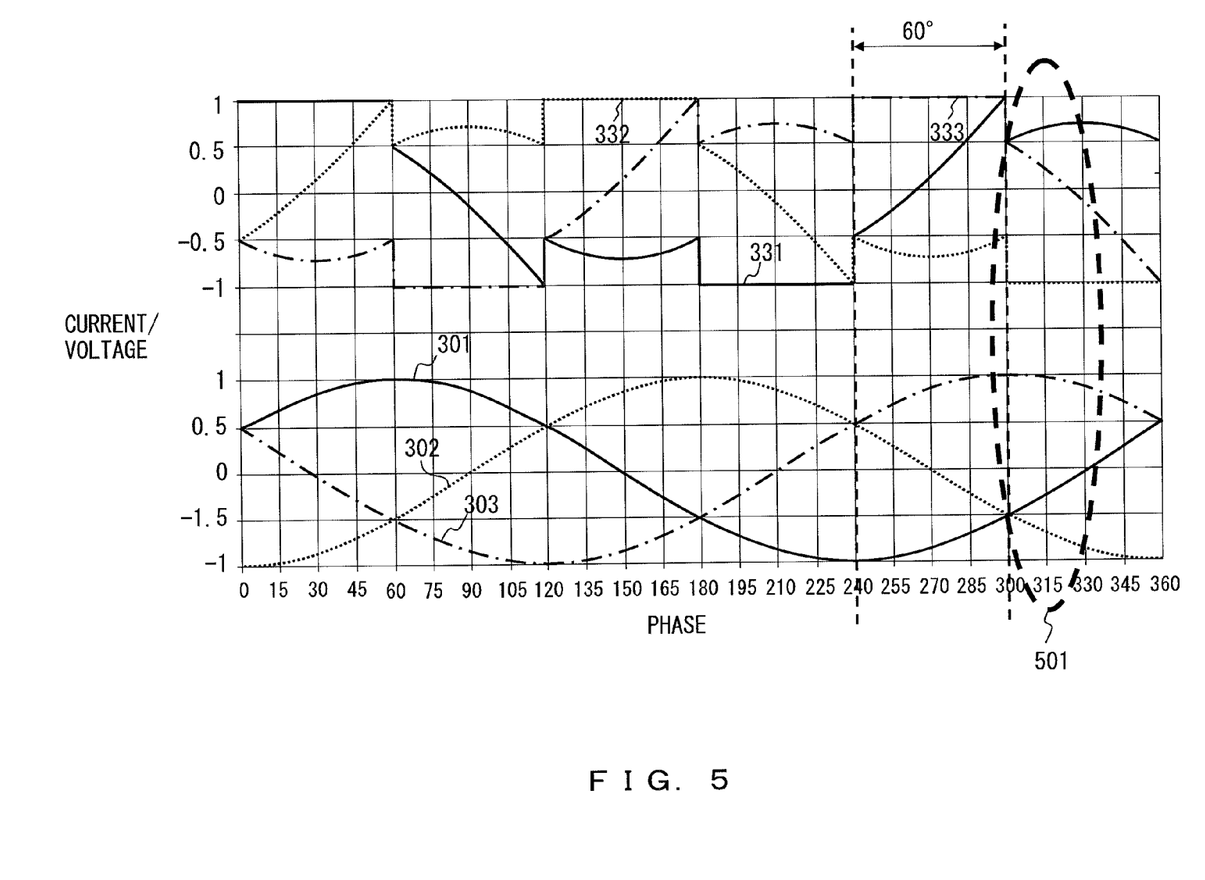
FIG. 5 is an example (3) of changes of a current command waveform of each phase, a voltage command waveform of each phase, a phase area of a current, and a phase area of a voltage command.

FIGS. 3 through 5 illustrate a current command waveform of each phase, a voltage command waveform of each phase, and a phase area of a current. The horizontal axis indicates the phase, the vertical axis indicates the current value, and the voltage value. FIG. 3 illustrates a U phase current command waveform 301, a V phase current command waveform 302, a W phase current command waveform 303, a U phase voltage command waveform Vu 321, a V phase voltage command waveform Vv 322, and a W phase voltage command waveform Vw 323. FIGS. 4 and 5 illustrate a U phase voltage command waveform Vu' 331, a V phase voltage command waveform Vv' 332, and a W phase voltage command waveform Vw' 333.

In the present embodiment, the range of the phase (electrical angle) obtained by dividing one rotation in electrical angle into 24 sections is defined as one phase area. The stationary phases are switched in 2 sections each (=30°). The phase area can be divided into smaller sections. The voltage command waveforms 321 through 323, and 331 through 333 of each phase are obtained after the operation depending on the settings of the stationary phase.

As illustrated in FIG. 2, the 2-3 phase conversion unit 130 includes a voltage reference 2-phase modulation unit 210, a current reference 2-phase modulation unit 220, a current phase calculation unit 230, a PWM control unit 240, and a motor inverter 250.

The voltage reference 2-phase modulation unit 210 calculates the voltage command values of the three phases based on Vd_cmd and Vq_cmd, determines the phase having (the amplitude (absolute value) of) the highest voltage as a candidate phase of the stationary phase from the phase of the voltage command value of each phase, and operates the voltage command value of each phase on the assumption that the determined candidate phase as a stationary phase. The "Vu", "Vv", and "Vw" in FIG. 2 respectively indicate the voltage command value of the U phase, the voltage command value of the V phase, and the voltage command value of the W phase after the operation.

The current phase calculation unit 230 calculates the current command value of each phase from the Id_ref and the Iq_ref, and calculates the phase of each phase from the calculated current command value of each phase. The current reference 2-phase modulation unit 220 inputs the current phase of each phase from the current phase calculation unit 230 and the Vu, Vv, and Vw of each phase from the voltage reference 2-phase modulation unit 210, and determines a stationary phase with the phase difference between the voltage and the current of each phase and the phase of the voltage and the current of each phase taken into account. Thus, when the determined stationary phase is different from the candidate phase determined by the voltage reference 2-phase modulation unit 210, the current reference 2-phase modulation unit 220 performs an operation of changing the stationary phase on the Vu, Vv, and Vw of each phase, and outputs the Vu, Vv, and Vw after the operation as Vu', Vv', and Vw' respectively.

The motor inverter 250 is provided with two switching elements for each phase. Switching elements 251 and 252 are provided for the U phase, switching elements 253 and 254 are provided for the V phase, and the switching elements 255 and 256 are provided for the W phase. Thus, the currents Iu, Iv, and Iw are supplied from between the switching elements 251 and 252, the switching elements 253 and 254, and the switching elements 255 and 256 respectively.

The PWM control unit 240 individually generates and supplies a drive signal for turning on and off each of the switching elements 251 through 256 using the Vu', Vv', and Vw' input from the current reference 2-phase modulation unit 220. By the supply of the drive signal, any switching element is constantly placed in the on position in the period of the phase set as the stationary phase.

The operation performed by the voltage reference 2-phase modulation unit 210 and the current reference 2-phase modulation unit 220 on the voltage command value of each phase, that is, the method of determining the correspondence between the stationary phase and the phase area, is practically described below with reference to FIGS. 3 through 5.

The voltage command values 321 through 323 of each phase illustrated in FIG. 3 correspond to Vu, Vv, and Vw output by the voltage reference 2-phase modulation unit 210, and the voltage command values 331 through 333 of each phase illustrated in FIG. 4 correspond to Vu', Vv', and Vw'.

FIGS. 3 and 4 are examples of the cases in which the phase difference between the voltage and the current is 30°. As illustrated in FIG. 3, according to the Vu, Vv, and Vw generated by the voltage reference 2-phase modulation unit 210, the phase having the largest absolute value of a voltage is defined as a stationary phase. For example, in the range of 210° through 270° of the phase in FIG. 3, the absolute value of the voltage command value 323 of the W phase is the largest. Therefore, in the voltage reference 2-phase modulation, the W phase is a stationary phase. The command voltage value of a stationary phase is adjusted to the maximum or minimum value, and the command voltage values of other phases are adjusted to maintain the voltage between the phases. The voltage reference 2-phase modulation unit 210 substantially determines the order in the decreasing order of the absolute value of the voltage.

In FIG. 4, based on the Vu, Vv, and Vw generated by the voltage reference 2-phase modulation unit 210, the current reference 2-phase modulation unit 220 generates the Vu', Vv', and Vw'. In this example, with the Vu', Vv', and Vw' generated by the current reference 2-phase modulation unit 220, the phase having the largest absolute value of the current is a stationary phase. For example, in the range of the phase of 240° through 300° in FIG. 4, the absolute value of the W phase current command waveform 303 is the largest. Therefore, in the current reference 2-phase modulation, the W phase is a stationary phase. Also in this case, the current command value of the stationary phase is adjusted to the largest or smallest value, and the voltage command values of other phases are adjusted to maintain the voltage between the phases. The current reference 2-phase modulation unit 220 determines whether or not the phase whose current command value has the largest absolute value can be defined as the stationary phase.

FIG. 5 is an explanatory view of an example of the case in which the phase difference between the voltage and the current is 60°. In FIG. 5, in the range (300° through 330°) of the phase enclosed by the broken line 501, the absolute value of the voltage command value for the V phase is the largest, and that for the U phase is the second largest. Therefore, the voltage reference 2-phase modulation unit 210 regards the V phase as a stationary phase in the range of 300° through 330°, and performs the operation on the voltage command value of each phase.

Next, in the range of 300° through 330°, the current reference 2-phase modulation unit 220 defines the W phase whose absolute value of the current command value is the largest as a candidate for a stationary phase. However, since the absolute value of the command voltage of the W phase is the smallest in the three phases, the W phase cannot be the stationary phase. Therefore, the V phase having the next largest absolute value of the current command value is defined as a candidate for the stationary phase. The absolute value of the voltage command value of the V phase is determined by the voltage reference 2-phase modulation unit 210 as the largest, and the V phase can be a stationary phase. Therefore, it is defined as the stationary phase.

Thus, according to the present embodiment, the correspondence between the candidate for the stationary phase and the phase area is determined from the voltage command value of each phase, the voltage command value of each phase is operated, and then the correspondence is changed as necessary by considering the current command value of each phase and the phase difference. Therefore, the stationary phase is determined for each phase area, thereby more efficiently suppressing the switching loss. To determine the stationary phase for each phase area, the rotation sensor value is output to each of the voltage reference 2-phase modulation unit 210 and the current reference 2-phase modulation unit 220. The voltage command values Vu', Vv', and Vw' obtained after the operation performed as necessary are input to the PWM control unit 240.

As described above, according to the present embodiment, the d-axis voltage command value Vd_cmd and q-axis voltage command value Vq_cmd are calculated from the d-axis current command value Id_ref and the q-axis current command value Iq_ref, and the calculated voltage command values Vd_cmd and Vq_cmd are used in determining the stationary phase. The stationary phase determination unit corresponds to at least the current reference 2-phase modulation unit 220. The drive unit corresponds to, for example, the PWM control unit 240 of the 2-3 phase conversion unit 130.

In the present embodiment, since the stationary phase is determined based on the current command value, the waveform of the current command value is more ideal than in the case in which the stationary phase is determined based on an actual current. Therefore, an appropriate phase can be determined as the stationary phase.

In addition, since the stationary phase is determined depending on the current command value after determining the phase which can be the candidate for the stationary phase based on the voltage command value, a more appropriate stationary phase can be determined than in the case in which the stationary phase is determined simply based on the current although the voltage phase and the current phase are largely deviated as illustrated in FIG. 5.

The d-axis current command value Id_ref and the q-axis current command value Iq_ref can be different from the actual Id and the actual Iq respectively. Therefore, the phase calculated from the actual Id and the actual Iq can be confirmed. The confirmation can be made by the current phase calculation unit 230 of the 2-3 phase conversion unit 130. The confirmation result can be reflected by the generation of the voltage command values Vu', Vv', and Vw' output to the PWM control unit 240. The reflection can be, for example, adopting the phase calculated from the actual Id and the actual Iq when there is a difference exceeding the allowable range between the phase calculated from each of the current command values Id_ref and Iq_ref and the phase calculated from the actual Id and the actual Iq.

In the embodiment above, the voltage reference 2-phase modulation unit 210 outputs the Vu, Vv, and Vw for which the stationary phase is determined, and then the current reference 2-phase modulation unit 220 changes the stationary phase and determines the Vu', Vv', and Vw', but the present invention is not limited to this configuration. For example, the voltage reference 2-phase modulation unit 210 first outputs the information about the phase which can be defined as the stationary phase based on the voltage, and the voltage command value for which the stationary phase has not been determined. Then, the current reference 2-phase modulation unit 220 specifies a candidate for the stationary phase based on the current value, judgments whether or not it can be defined as the stationary phase, then determines the stationary phase, and outputs the Vu', Vv', and Vw'.

What is claimed is:

1. A control method of a motor inverter which having switching elements for each phase of the 3-phase motor and driving the motor by turning on and off the switching elements, comprising:

dividing one rotation in electrical angle of a rotor of the motor into a plurality of areas, and defining a phase in a plurality of phases provided with switching elements for each area as a stationary phase in which a switching operation is not performed, based on current command value of each phase acquired from d-axis current command value and q-axis current command value of the motor; and performing the switching operation of the switching elements of phases other than the stationary phase determined for each area, thereby realizing the 2-phase modulation control, wherein the stationary phase is determined after determining candidate phases as possible stationary phase depending on a voltage command value of each phase, and selecting a candidate phase from among determined candidate phases depending on the current command value of each phase.

2. The control method according to claim 1, wherein
phases of the d-axis current command value and the q-axis current command value are confirmed using a d-axis actual current value and a q-axis actual current value acquired from a current actually supplied to the motor.

3. A control device for controlling a motor inverter which having switching elements for each phase of the 3-phase motor and driving the motor by turning on and off the switching elements, comprising:

a stationary phase determination unit defining a phase in a plurality of phases provided with switching elements for each area as a stationary phase in which a switching operation is not performed, based on current command value of each phase acquired from d-axis current command value and q-axis current command value of the motor, with one rotation in electrical angle of a rotor of the motor divided into a plurality of areas; and a drive unit performing the switching operation of switching elements of phases other than the stationary phase determined for each area, and realizing 2-phase modulation control, wherein the stationary phase is determined after determining candidate phases as possible stationary phase depending on a voltage command value of each phase, and selecting a candidate phase from among determined candidate phases depending on the current command value of each phase.

* * * * *